United States Patent
Lu

(10) Patent No.: US 7,567,397 B2
(45) Date of Patent: Jul. 28, 2009

(54) ADJACENT TRACK INTERFERENCE (ATI) IDENTIFICATION METHODOLOGY

(75) Inventor: Danzhu Lu, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 320 days.

(21) Appl. No.: 11/519,363

(22) Filed: Sep. 11, 2006

(65) Prior Publication Data

US 2008/0062550 A1 Mar. 13, 2008

(51) Int. Cl.
*G11B 27/36* (2006.01)
(52) U.S. Cl. .............. 360/31; 360/53; 360/60; 360/75; 360/77.04; 360/77.06
(58) Field of Classification Search .......... 360/31, 360/48, 75, 77.02
See application file for complete search history.

(56) References Cited

U.S. PATENT DOCUMENTS

| | | | |
|---|---|---|---|
| 5,600,500 A | | 2/1997 | Madsen et al. |
| 5,772,794 A | | 6/1998 | Uno et al. |
| 5,812,337 A | * | 9/1998 | Tanaka et al. ............ 360/73.12 |
| 5,995,305 A | | 11/1999 | McNeil et al. |
| 6,101,053 A | | 8/2000 | Takahashi |
| 6,128,166 A | * | 10/2000 | Tanaka et al. ............... 360/317 |
| 6,178,054 B1 | | 1/2001 | Wakefield |
| 6,185,063 B1 | * | 2/2001 | Cameron ................. 360/78.04 |
| 6,265,868 B1 | | 7/2001 | Richter |
| 6,384,599 B1 | | 5/2002 | Chan et al. |
| 6,476,992 B1 | * | 11/2002 | Shimatani .................... 360/46 |
| 6,680,609 B1 | | 1/2004 | Fang et al. |
| 6,791,775 B2 | * | 9/2004 | Li et al. ........................ 360/31 |
| 6,791,780 B2 | * | 9/2004 | Lee et al. ...................... 360/66 |
| 6,975,468 B1 | * | 12/2005 | Melrose et al. ............... 360/31 |
| 7,082,007 B2 | * | 7/2006 | Liu et al. ................. 360/77.02 |
| 7,126,890 B2 | * | 10/2006 | Learned et al. .......... 369/44.32 |
| 7,170,700 B1 | * | 1/2007 | Lin et al. ....................... 360/31 |
| 7,271,977 B1 | * | 9/2007 | Melrose et al. .......... 360/77.04 |
| 7,408,731 B2 | * | 8/2008 | Uemura et al. ................ 360/48 |
| 7,486,460 B2 | * | 2/2009 | Tsuchinaga et al. .......... 360/48 |
| 2002/0030912 A1 | * | 3/2002 | Kasajima et al. .............. 360/31 |
| 2003/0072097 A1 | | 4/2003 | Li et al. |
| 2004/0080845 A1 | * | 4/2004 | Yeo et al. ...................... 360/31 |
| 2004/0150903 A1 | * | 8/2004 | Malone, Sr. .................. 360/31 |
| 2005/0180267 A1 | * | 8/2005 | Jeong et al. ................... 368/96 |
| 2006/0098318 A1 | * | 5/2006 | Feng ........................... 360/31 |

OTHER PUBLICATIONS

Kim, Young, et al., "Design of Recessed Yoke Heads for Minimizing Adjacent Track Encroachment", *IEEE Transactions on Magnetics*, vol. 36, No. 5,(Sep. 2000),pp. 2524ff.

(Continued)

*Primary Examiner*—Hoa T Nguyen
*Assistant Examiner*—Dismery E Mercedes

(57) ABSTRACT

A method for identifying adjacent track interference for a head is provided. The method comprises writing a first data track at a predetermined track position; writing a second data track two track positions away from the first data track; and validating the position of the first data track and the second data track. Upon validation the method further comprises writing a third data track between the first data track and the second data track and analyzing a signal profile of at least one of the first data track and the second data track for adjacent track interference.

19 Claims, 8 Drawing Sheets

OTHER PUBLICATIONS

Li, Zhihao, et al., "Adjacent Track Enroachment Analysis at High Track Density", *Journal of Applied Physics*, vol. 93, No. 10,(May 15, 2003),pp. 6456ff.

Li, Zhaohui, et al., "Impact of Head Thermal Movement to Adjacent Track Encroachment", *Journal of Applied Physics*, vol. 91, No. 10,(May 15, 2002),pp. 7568ff.

Zhang, Kezhao, "Adjacent Track Interference Due to Side Reading and BER Performance", *IEEE Transactions on Magnetics*, vol. 40, No. 4.,(Jul. 2004),pp. 2607ff.

* cited by examiner

ADJACENT TRACK INTERFERENCE (ATI) IDENTIFICATION METHODOLOGY

TECHNICAL FIELD

The present invention relates generally to the field of hard disk drives. In particular, embodiments of the present invention relate to a method of identifying Adjacent Track Interference (ATI).

BACKGROUND ART

Direct access storage devices (DASD) have become part of everyday life, and as such, expectations and demands continually increase for greater speed for manipulating and holding larger amounts of data. To meet these demands for increased performance, the mechanical assembly in a DASD device, specifically the Hard Disk Drive (HDD) has undergone many changes.

In order for an HDD to hold more data, advances in the magnetic recording heads as well as the disk media on which the data is written have undergone major advances in the past few years. One factor in determining the amount of data that can be stored in an HDD is the ability of the magnetic recording head to write closely spaced data tracks onto the disk surface.

The magnetic recording head is fabricated to physical dimensions that typically enable the magnetic recording head to write a data track to a specified width. The track width will determine how close the data tracks can be written. One of the more critical dimensions of the magnetic recording head that influences track width is known as the pole-tip width. The pole-tip is the magnetic material of the magnetic recording head that is closest to the disk. The pole-tip allows magnetic flux to emanate from the magnetic recording head and into the disk.

The pole-tip width can be measured directly by inspecting the surface of the magnetic recording head that is exposed to the disk surface. Measuring pole-tip width does not always predict the resulting track width. There are anomalies in the fabrication of magnetic recording heads that can cause the heads to write a wider track than expected, or can cause the written track center to be different from the pole-tip center.

It is important in the development phase of a new HDD product to identify if a newly designed magnetic recording head is writing tracks of specified width, and writing tracks on center. Both wide written tracks and off-centered tracks will adversely affect previously written adjacent tracks.

The phenomenon of a magnetic recording head writing a wide track is known as "track squeeze." The phenomenon of a head that writes off-center is known as Adjacent Track Interference or ATI. The corrective action for each can be different, and it is important to the development of the magnetic recording head to determine which phenomenon is occurring to prescribe the proper corrective action. The ATI identification methods of today mistakenly identify heads with track squeeze as heads with ATI.

With today's test methods, it is not possible to determine whether a magnetic recording head that is adversely affecting previously written tracks is a head that has track squeeze or ATI. What is needed is a test method for detecting the difference between track squeeze and ATI in a repeatable and accurate manner.

SUMMARY OF THE INVENTION

A method for identifying adjacent track interference for a head is described herein. The method comprises writing a first data track at a predetermined track position; writing a second data track two track positions away from the first data track; and validating the position of the first data track and the second data track. Upon validation the method further comprises writing a third data track between the first data track and the second data track and analyzing a signal profile of at least one of the first data track and the second data track for adjacent track interference.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

The methods described herein are used to identify magnetic recording heads that when writing data tracks, cause interference with a previously written adjacent track. It is critical in the development of new magnetic recording heads to properly identify heads with Adjacent Track Interference (ATI). When ATI is discovered, the severity of the ATI and the identification information of the head are reported to the head manufacturer, whereby the cause is investigated and corrective action is initiated.

The discussion will begin with an overview of a Hard Disk Drive (HDD), and components connected therewith. The discussion will then address the writing of data tracks on a disk, the definition of track width, and some anomalies that can occur in writing a data track. The discussion will then present the operation of various embodiments of the present invention for identifying ATI.

Overview

Figure 1:
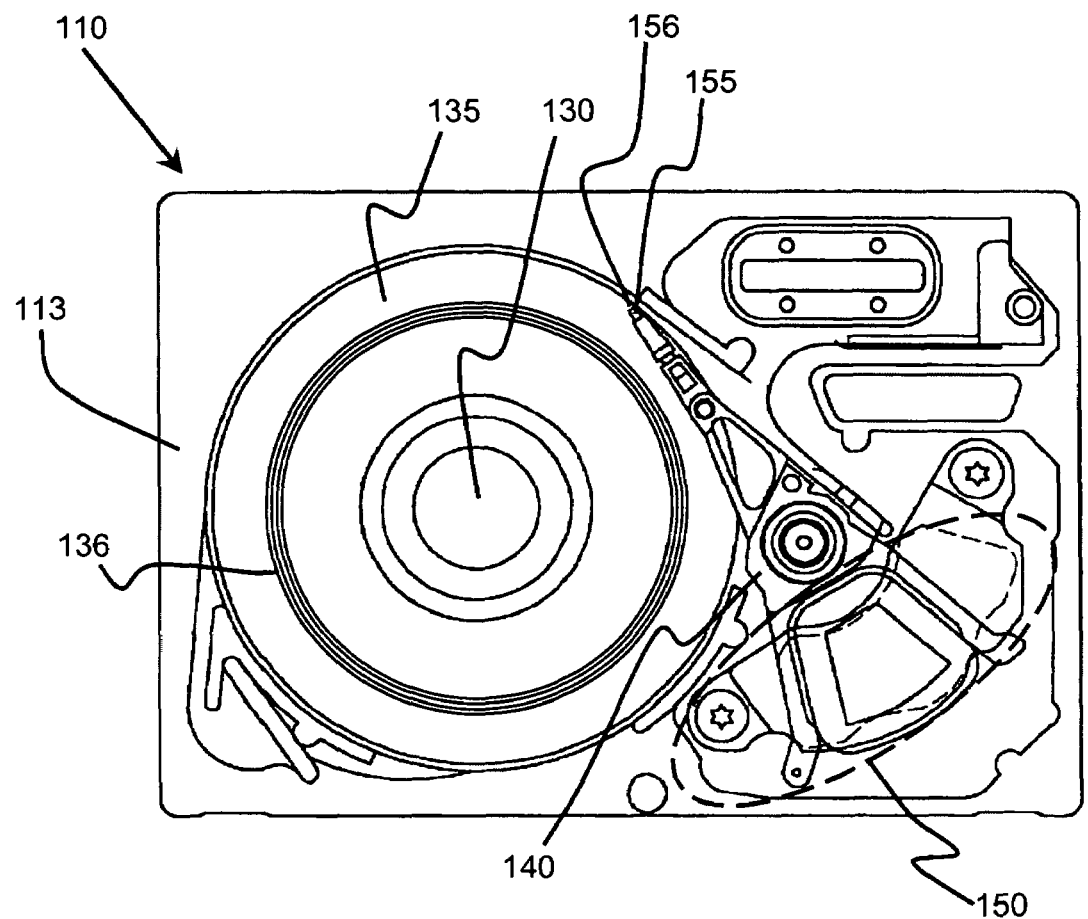
FIG. 1 is a plan view of an HDD with cover and top magnet removed in accordance with one embodiment of the present invention.

With reference now to FIG. 1, a plan view of an HDD with cover and top magnet removed is shown in accordance with one embodiment of the present invention. FIG. 1 illustrates the relationship of components and sub-assemblies of HDD 110 and a representation of data tracks 136 recorded on the disk surface 135. The cover is removed and not shown so that the inside of HDD 110 is visible. The components are assembled into base casting 113, which provides attachment and registration points for components and sub-assemblies.

Data is recorded onto disk surface 135 in a pattern of concentric rings known as data tracks 136. Disk surface 135 is spun at high speed by means of a motor-hub assembly 130. Data tracks 136 are recorded onto disk surface 135 by means of magnetic recording head 156, which typically resides at the end of slider 155. Voice Coil Motor 150 rotates actuator 140 such that magnetic recording head 156 is swung arcuately across disk 135 and thus accesses data tracks 136. The quantity of data tracks 136 recorded on disk surface 135 is determined partly by the dimensions of magnetic recording head 156, in particularly the width of the pole-tips of the magnetic recording head.

FIG. 1 being a plan view shows only one head and one disk surface combination. One skilled in the art understands that what is described for one head-disk combination applies to multiple head-disk combinations. However, for purposes of brevity and clarity, FIG. 1 only shows one head and one disk surface.

Figure 2:
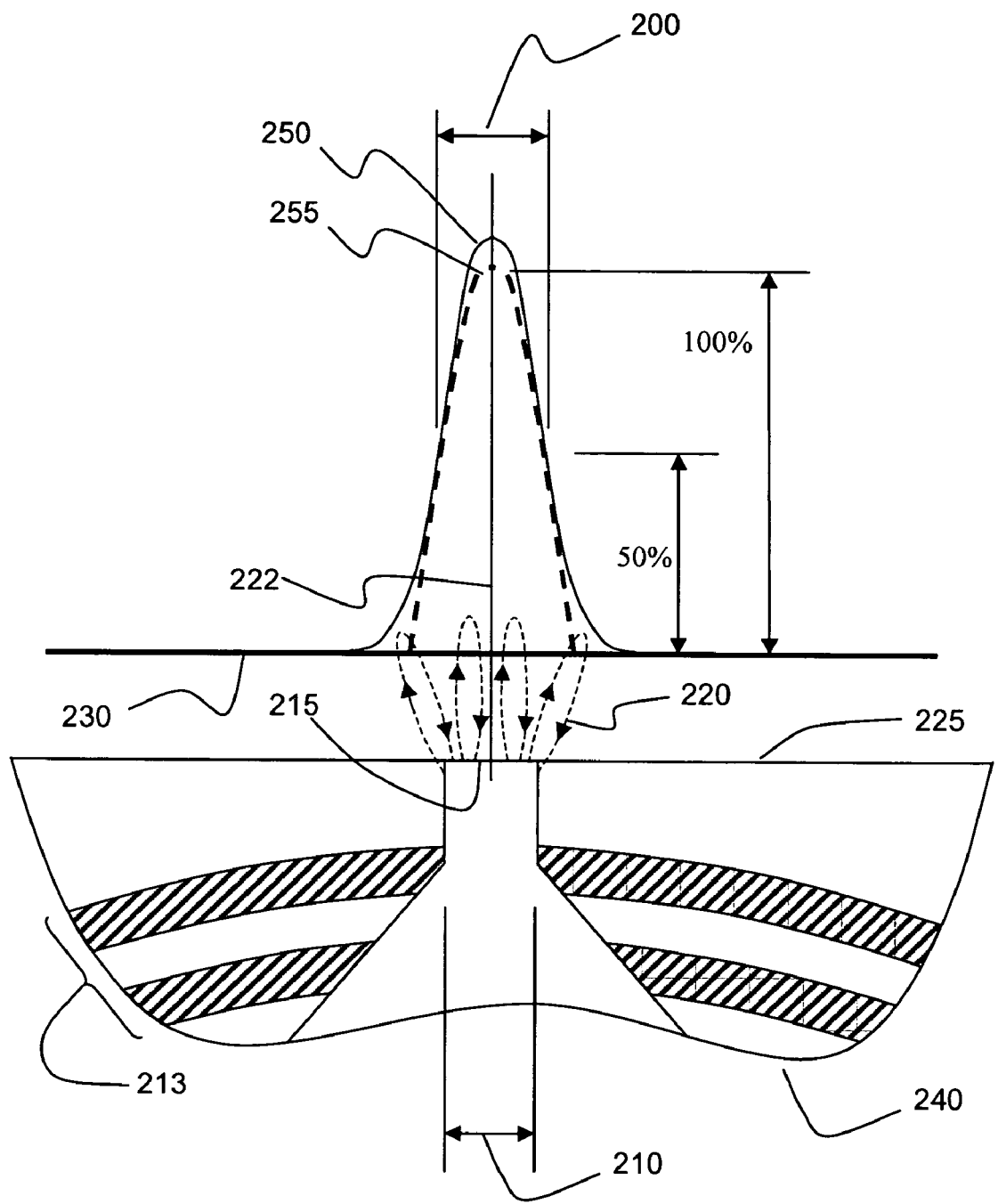
FIG. 2 is a detail of a nominal magnetic recording head and a resulting normal data track signal profile in accordance with one embodiment of the present invention.

Referring to FIGS. 2, detail 240 of a magnetic recording head shows part of write coil 213 and pole-tip 215. Pole-tip width 210 is a measurement of pole-tip 215 in the radial direction of the disk. Pole-tip width is measured at surface 225, typically referred to as the Air Bearing Surface or ABS. However, pole-tip width 210 is not the width 200 of written data track 250.

The width 200 of written data track 250 is defined as the width of signal profile 255 at 50% of the amplitude of signal profile 255. This definition for width 200 is typically referred to as 50% Pulse Width or $PW_{50}$. Written data track 250 is usually not the same width as pole-tip width 210. Written data track 250 (as well as written data track 350 in FIG. 3) is a theoretical distribution of magnetic field strength in disk 230 that has been magnetized by magnetic flux 220 emanating from pole-tip 215. Signal profile 255 is the amplitude of written data track 250 as read by the MR or GMR sensor (not visible in this view) which is adjacent to pole-tip 215. FIG. 2 presents a nominal magnetic recording head, which produces a symmetric flux field 220 emanating from pole-tip 215.

Written data track 250 is normally written at the same location as pole-tip 215, thus resulting in pole-tip centerline 222 coinciding with the track centerline (not visible in FIG. 2). For a nominally performing magnetic recording head as shown in FIG. 2, magnetic flux 220, written data track 250, signal profile 255 and pole-tip 210 are all centered and symmetric about pole-tip centerline 222. For an abnormally performing magnetic recording head, magnetic flux becomes asymmetric and ATI becomes a problem.

Figure 3:
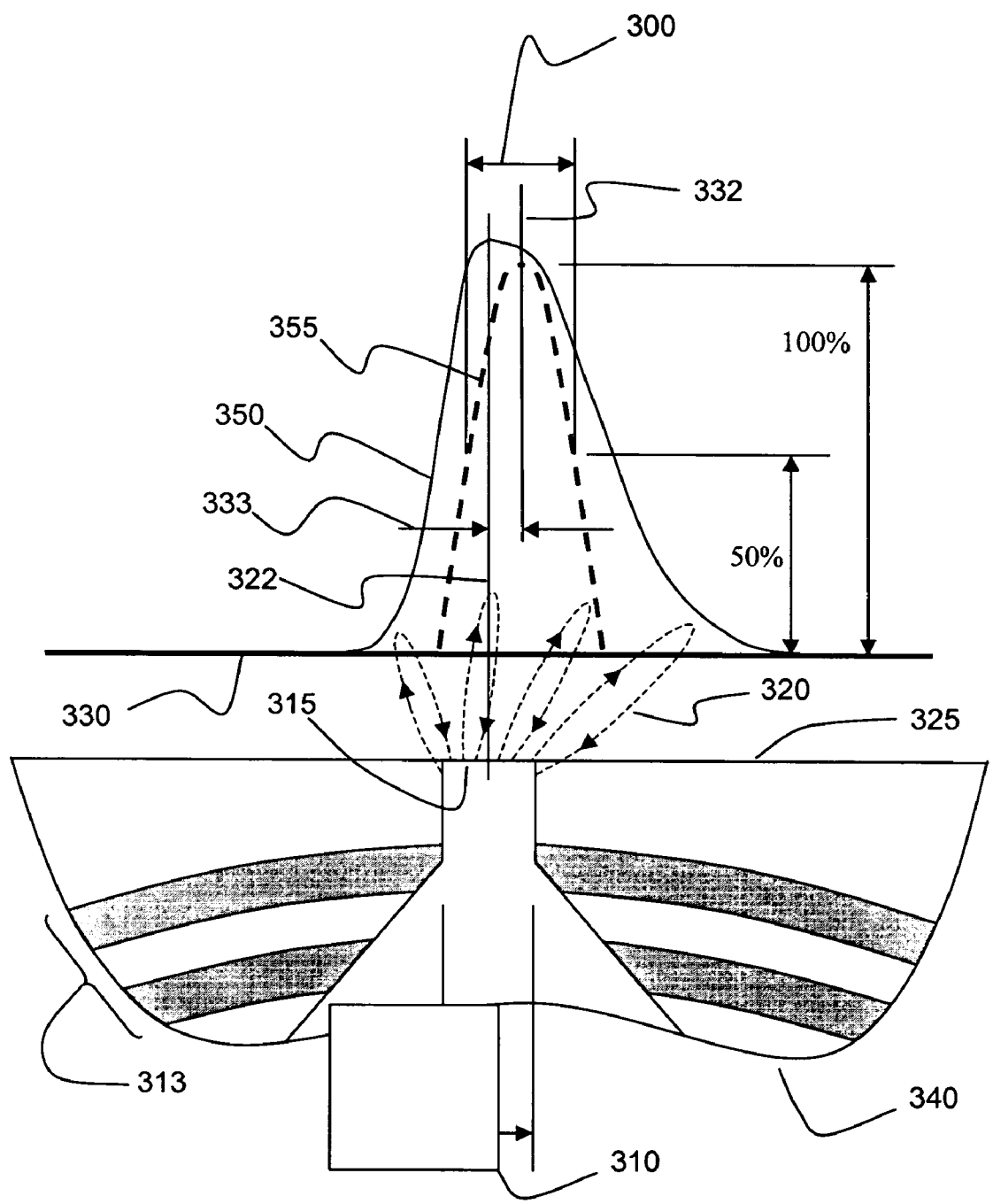
FIG. 3 is a detail of an abnormal magnetic recording head and a resulting abnormal data track signal profile in accordance with one embodiment of the present invention.

Referring to FIG. 3, detail 340 of a magnetic recording head, pole-tip 315, write coil 313, ABS 325, and disk 330 are similarly presented as in FIG. 2. Pole-tip width 310, pole-tip centerline 322, width 300, written data track 350, and signal profile 355 are similarly defined as in FIG. 2. FIG. 3 presents an abnormal magnetic recording head, which produces an asymmetric flux field 320 emanating from pole-tip 315.

The affect of asymmetric flux field 320 is a written data track 350 that is also asymmetric and skewed to one side. Since signal profile 355 is the amplitude of written data track 350 as read by the MR or GMR sensor, signal profile 355 and track centerline 332 are offset from pole-tip centerline 322. The offset of track centerline 332 from pole-tip centerline 322 causes an apparent track-shift 333 in the position of data tracks 136 in FIG. 1.

Operation

Figure 4:
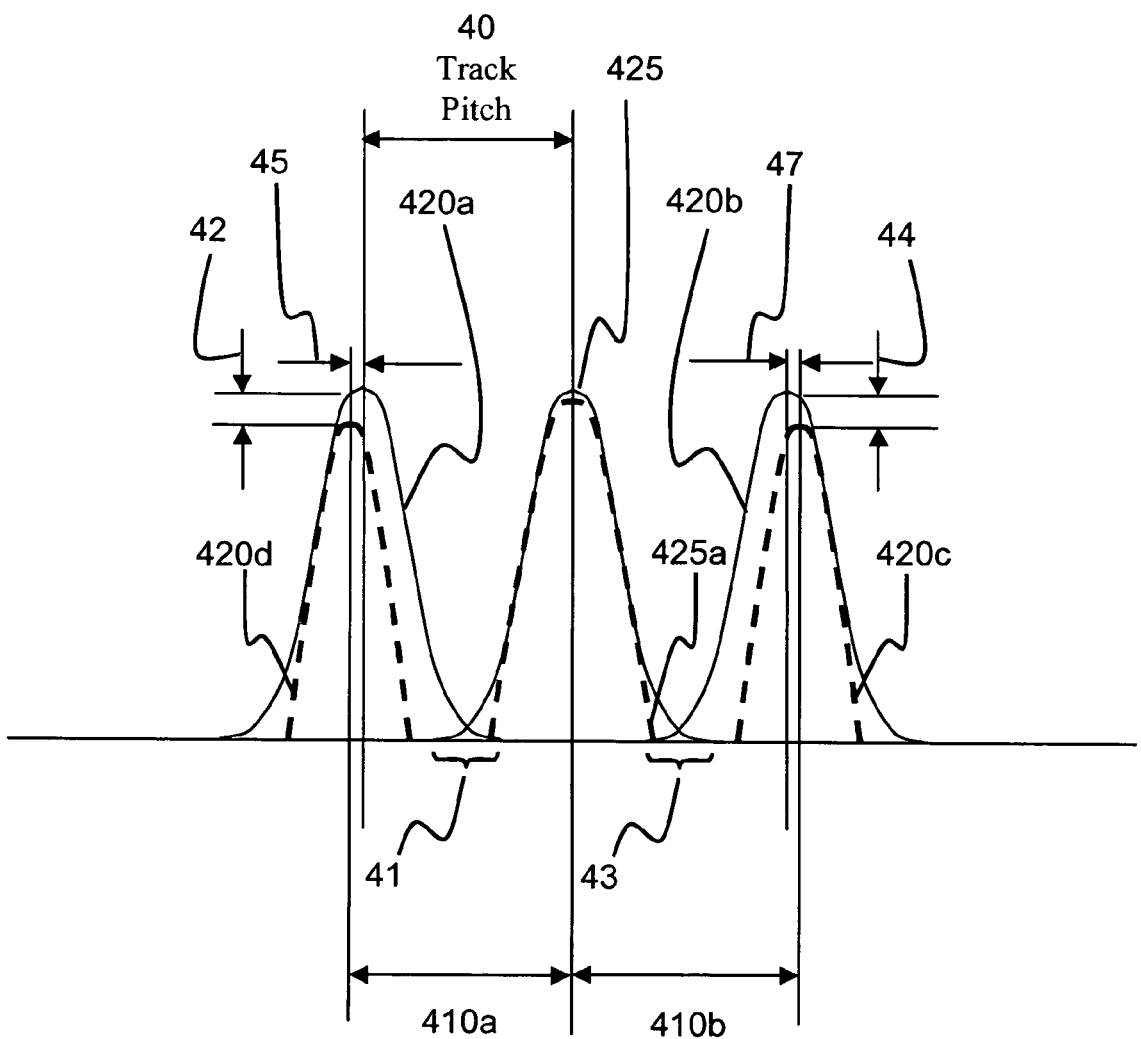
FIG. 4 is a plot of signal profiles in accordance with one embodiment of the present invention.

Referring to FIG. 4, plot 400 presents data tracks and signal profiles of three adjacently written data tracks in accordance with an embodiment of the present invention. Track Pitch 40 is the distance between written data tracks that the magnetic recording head is designed to write. Data track 420a is written first followed by the writing of a second data track 420b. First data track 420a and second data track 420b constitute a pair of data tracks. The position of the first data track and the position of the second data track are validated to assure that their spacing is two Track Pitch apart.

In accordance with the present embodiment, a third data track 425 is written between data tracks 420a and 420b. Analysis of signal profile 420c and/or signal profile 420d will reveal if the magnetic recording head that wrote data tracks 420a, 420b and 425 causes ATI. Analysis of signal profile 420c and/or signal profile 420d will also validate if the data tracks 420a and 420b are written in the correct position.

Analysis consists of an overall comparison of changes in signal profile(s). For brevity and clarity, the signal profiles of data tracks 420a and 420b are not shown prior to writing data track 425. The signal profiles of data tracks 420a and 420b prior to writing data track 425 are similar to signal profile 425a of data track 425. Signal profile 420d and signal profile 420c reflect changes in signal profiles for data tracks 420a and 420b that are caused by writing data track 425.

An example of analysis performed on at least one signal profiles 420c and 420d is to look for symmetry in the changes of the signal profiles. Symmetric changes between signal profiles 420c and 420d usually indicate that there is not a problem with ATI. Writing data track 425 multiple times at the same position accentuates any lack of symmetry that might be present. Examples of symmetric changes can be changes in signal profile amplitude 42 and 44, peak-shift 45 and 47, and track pitch 410a and 410b. Amplitude reduction 42 and 44, peak-shift 45 and 47, and track pitch 410a and 410b are the result of overlaps 41 and 43 between written data tracks 420a, 420b and subsequent written data track 425. Overlaps 41 and 43 of data track 425 erase overlapping parts of previously written data tracks 420a and 420b. The examples of symmetry analyses are not meant to limit the scope of this invention but are provided herein merely for purposes of brevity and clarity.

Referring to FIG. 2, $PW_{50}$ 200 is derived and specified from the requirements of the HDD. It is possible that a magnetic recording head has $PW_{50}$ 200 that does not meet specified limits and still have its track centerline coincident with pole-tip centerline 222. A magnetic recording head with a wider than specified $PW_{50}$ will write tracks that will overlap adjacent tracks. A magnetic recording head, which writes a wide track, is known as "track squeeze." Track squeeze can cause a head that is writing tracks off center to be mistaken for a magnetic recording head that causes ATI, and that is writing tracks at an incorrect position.

It is possible to have a magnetic recording head that produces a $PW_{50}$ that is to specification but causes ATI. FIG. 3 demonstrates a possibility wherein flux field 320 is asymmetric and produces track shift 333. By defining $PW_{50}$ as the width of a signal profile at 50% of the amplitude of the signal profile, $PW_{50}$ 200 in FIG. 2 can be equal to $PW_{50}$ 300 in FIG. 3. Therefore, testing for track squeeze cannot by itself detect a magnetic recording head that will produce ATI.

Therefore, it is important to verify that $PW_{50}$ 200 is within specified limits and that data tracks are written at the correct position. In accordance with an embodiment of the present invention, $PW_{50}$ 200 is verified to be within the specified limits for proper performance thus verifying that the magnetic recording head is not predisposed to track squeeze. Verification that the data tracks are written in the correct position is in accordance with embodiments of the present invention.

In accordance with an embodiment of the present invention, verifying that the magnetic recording head is not predisposed to track squeeze consists of writing a reference track. The signal profile of the reference track can be analyzed for $PW_{50}$ that the magnetic recording head produces. Analysis of the signal profile for $PW_{50}$ is an example of the analysis that can be done for verifying that a magnetic recording head is not predisposed to track squeeze. The analysis of the signal profile for $PW_{50}$ is not meant to limit the scope of this invention but is provided herein merely for purposes of brevity and clarity.

Figure 5:
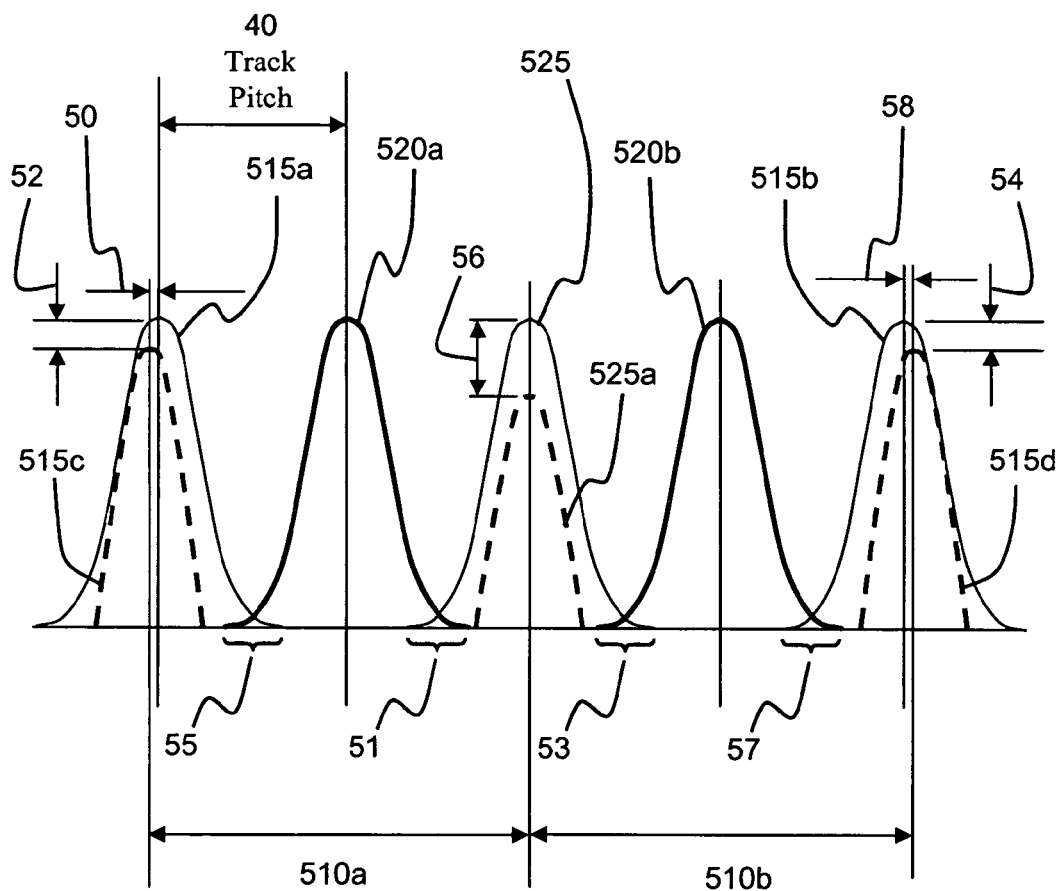
FIG. 5 is a plot of signal profiles in accordance with one embodiment of the present invention.

Referring to FIG. 5, plot 500 presents data tracks and signal profiles of five adjacently written data tracks in accordance with another embodiment of the present invention. The data tracks written in plot 500 are written with a nominal magnetic recording head, similar to that presented in FIG. 2. Data track 515a is written first followed by the writing of data track 515b, four Track Pitch 40 away. First data track 515a and second data track 515b constitute a pair of data tracks. A third data track 525 is written between data tracks 515a and 515b. Data tracks 515a, 515b, and 525 are written with a separation of one Track Pitch.

In accordance with the embodiment of the present invention, a fourth data track 520a and fifth data track 520b are written between data tracks 515a and 515b and adjacent to data track 525. Fourth data track 520a and fifth data track 520b constitute a pair of data tracks. Analysis of at least one signal profile 515c, 515d and 525a will reveal if the magnetic recording head that wrote data tracks 515a, 515b, 525, 520a, and 520b causes ATI. Analysis of at least one signal profile 515c, 515d and 525a will also validate if data tracks 515a, 515b, 525, 520a, and 520b are written in the correct position.

Analysis consists of an overall comparison of changes in signal profile(s). For brevity and clarity, the signal profiles of data tracks 515a, 515b, and 525 are not shown prior to writing data tracks 520a and 520b. The signal profiles of data tracks 515a, 515b, and 525 prior to writing data tracks 520a and 520b are similar to the signal profile 255 of data track 250 in FIG. 2. Signal profile 255 verifies that the magnetic recording head that has written the data tracks in plot 500 is not predisposed to track squeeze. Signal profiles 515c, 515d, and 525a show changes in signal profiles for data tracks 515a, 515b and 525 that are caused by writing data tracks 520a and 520b.

An example of analysis performed on at least one signal profiles 515c, 515d, and 525a is to look for symmetry in the changes of the signal profiles. Symmetric changes between signal profiles 515c, 515d, and 525a usually indicate that there is not a problem with ATI or the position of a data track. Writing data tracks 520a and 520b multiple times at the same position accentuates any lack of symmetry that might be present.

Examples of symmetric changes can be changes in signal profile amplitude 52, 54, and 56, peak-shift 55 and 57, and track pitch intervals 510a and 510b. Reduced amplitudes 52, 54, and 56, peak-shift 50 and 58, and track pitch intervals 510a and 510b are the result of overlaps 51, 53, 55, and 57 between written data tracks 515a, 515b, 525 and subsequently written data tracks 520a and 520b. Overlaps 55 and 51 of data track 520a and overlaps 53 and 57 of data track 520b erase overlapping parts of previously written data tracks 515a, 515b and 525. The examples of symmetry analyses are not meant to limit the scope of this invention but are provided herein merely for purposes of brevity and clarity.

Figure 6:
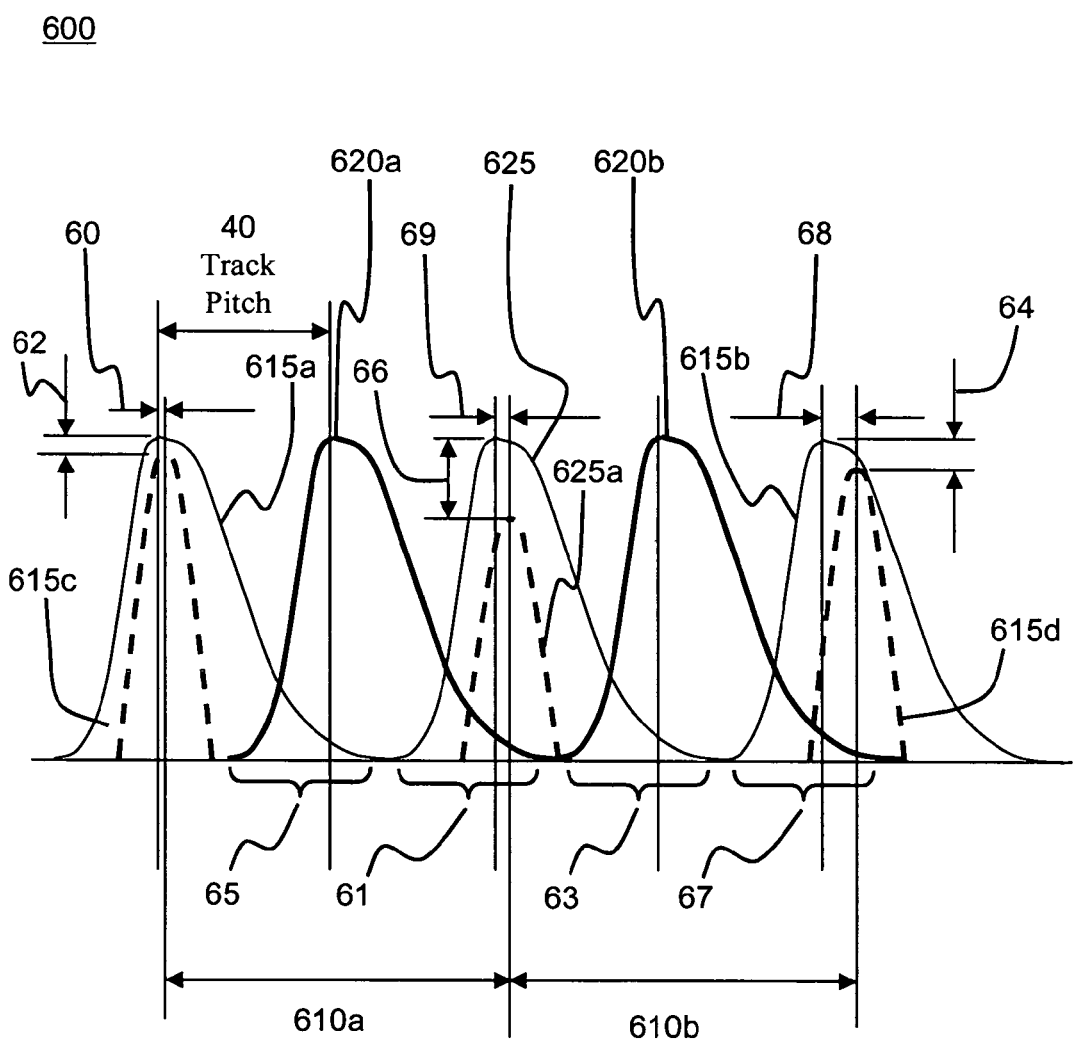
FIG. 6 is a plot of signal profiles in accordance with one embodiment of the present invention.

Referring to FIG. 6, plot 600 presents data tracks and signal profiles of five adjacently written data tracks in accordance with another embodiment of the present invention. Plot 600 is similar to plot 500. However, the data tracks written in plot 600 are written with an abnormal magnetic recording head, similar to that presented in FIG. 3. Data track 615a is written first followed by the writing of data track 615b, four Track Pitch 40 away. First data track 615a and second data track 615b constitute a pair of data tracks. A third data track 625 is written between data tracks 615a and 615b. Data tracks 615a, 615b, and 625 are written with a separation of one Track Pitch.

In accordance with an embodiment of the present invention, a fourth data track 620a and fifth data track 620b are written between data tracks 615a and 615b and adjacent to data track 625. Fourth data track 620a and fifth data track 620b constitute a pair of data tracks. Analysis of at least one signal profile 615c, 615d and 625a will reveal if the magnetic recording head that wrote data tracks 615a, 615b, 625, 620a, and 620b causes ATI. Analysis of at least one signal profile 615c, 615d and 625a will also validate if data tracks 615a, 615b, 625, 620a, and 620b are written in the correct position.

Analysis consists of an overall comparison of changes in signal profile(s). For brevity and clarity, the signal profiles of data tracks 615a, 615b, and 625 are not shown prior to writing data tracks 620a and 620b. The signal profiles of data tracks 615a, 615b, and 625 prior to writing data tracks 620a and 620b are similar to the signal profile 355 of data track 350 in FIG. 3. Signal profile 355 verifies that the magnetic recording head that has written the data tracks in plot 600 is not predisposed to track squeeze. However, signal profile 355 cannot show that the magnetic recording head presented in FIG. 3 is abnormal and will produce ATI. Signal profiles 615c, 615d, and 625a show changes in signal profiles for data tracks 615a, 615b and 625 that are caused by writing data tracks 620a and 620b.

An example of analysis performed on at least one signal profiles 615c, 615d, and 625a is to look for symmetry in the changes of the signal profiles. Asymmetric changes between signal profiles 615c, 615d, and 625a usually indicate that there is a problem with ATI or the position of a data track. Writing data tracks 620a and 620b multiple times at the same position accentuates any asymmetry that might be present.

Examples of asymmetric changes can be changes in signal profile amplitude 62, 64, and 66, peak-shift 60, 68, and 69 track pitch intervals 610a and 610b. Plot 600 presents a possible occurrence of symmetric and equal track pitch intervals 610a and 610b, whereas signal profile amplitude 62, 64, and 66, peak-shift 60 and 68 are asymmetric. Reduced amplitude 62, 64, and 66, peak-shift 60, 68 and 69, and track pitch intervals 610a and 610b are the result of overlaps 61, 63, 65, and 67 between written data tracks 615a, 615b, 625 and subsequently written data tracks 620a and 620b. Overlaps 65 and 61 of data track 620a and overlaps 63 and 67 of data track 620b erase overlapping parts of previously written data tracks 615a, 615b and 625. The examples of asymmetry analyses are not meant to limit the scope of this invention but are provided herein merely for purposes of brevity and clarity.

It is obvious to one skilled in the art that the data and reference tracks written in accordance with the embodiments of the present invention can contain any form of data, including, but not limited to servo data. Writing servo data is one means for validating the position of a written data track. It is also obvious to one skilled in the art that the order of writing data tracks can be altered from that which is presented without changing the spirit of the embodiments of the present invention.

Figure 7:
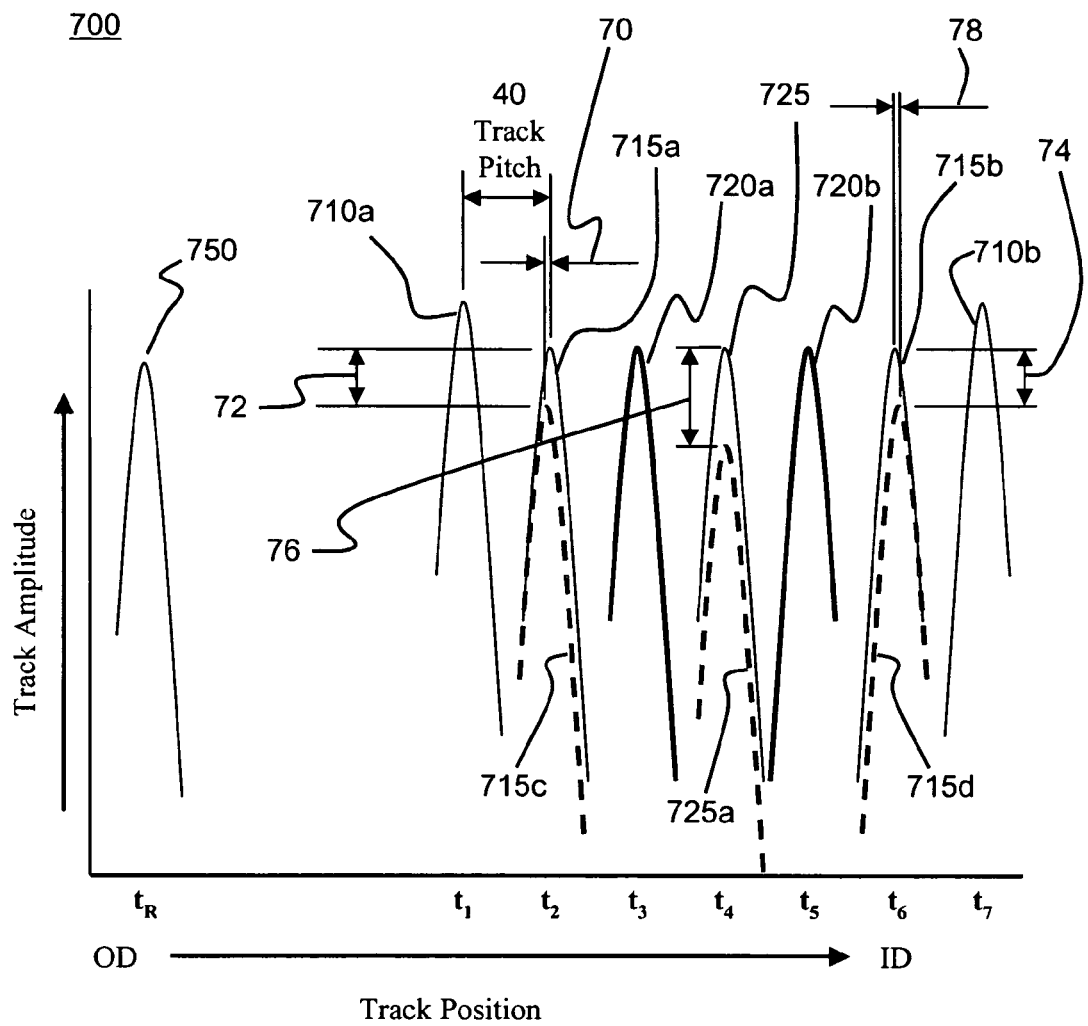
FIG. 7 is a plot of signal profiles in accordance with one embodiment of the present invention.

Referring to FIG. 7, plot 700 presents the signal profiles of seven adjacently written data tracks and the signal profile of one reference data track, in accordance with an embodiment of the present invention. The data tracks written in plot 700, wherein whose signal profiles are plotted, are written with a nominal magnetic recording head, similar to that presented in FIG. 2. For brevity and clarity, the data tracks that coincide with the signal profiles are not shown.

Figure 8:
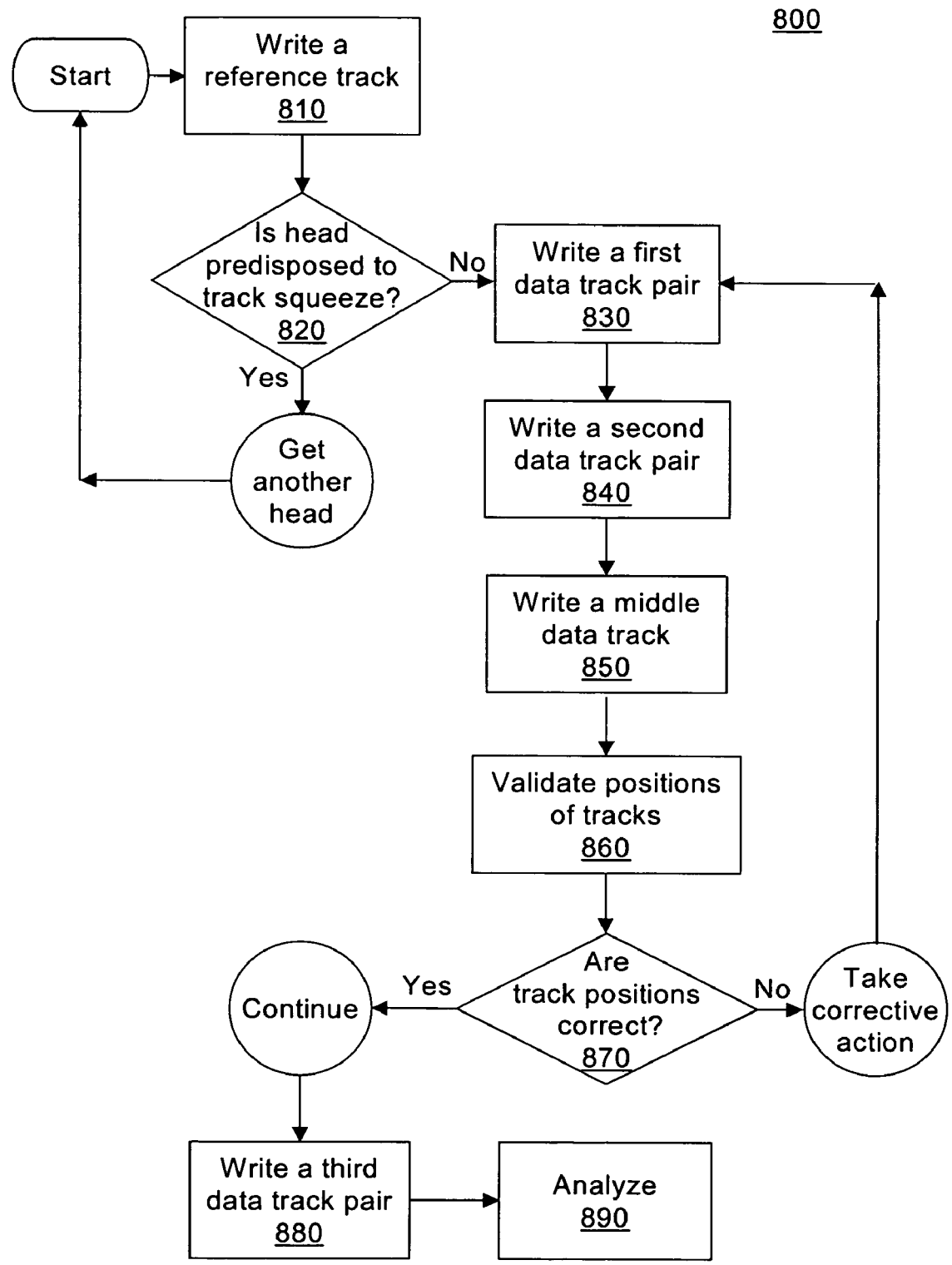
FIG. 8 is a flow chart illustrating the steps of a method for identifying adjacent track interference for a head in accordance with one embodiment of the present invention.

With reference now to FIG. 8, a flowchart 800 of a method for identifying a magnetic recording head with Adjacent Track Interference (ATI) is shown, in accordance with an embodiment of the present invention. In general, flowchart 800 includes processes that may be carried out by processors, electrical components and assembly mechanisms under the control of computer readable and computer executable instructions. The computer readable and computer executable instructions reside, for example, in data storage features such as a computer usable volatile memory and/or a computer usable non-volatile memory and/or a data storage device. However, the computer readable and computer executable instructions may reside in any type of computer readable medium.

Although specific processes are disclosed in flowchart 800, such processes are exemplary. That is, the present invention is well suited to performing various other processes or variations of the processes recited in FIG. 8. Within the present embodiment, it should be appreciated that the processes of flowchart 800 may be performed by software, by hardware, by an assembly mechanism, through human interaction, or by any combination of software, hardware, assembly mechanism, and human interaction.

Referring now to 810 of flowchart 800 and to FIG. 7, a reference track, shown in FIG. 7 as $t_R$, is written. It is important that the magnetic recording head being analyzed for ATI is a nominally performing head and is not predisposed to track squeeze.

Referring now to 820 of flowchart 800 and to FIG. 7, the magnetic recording head being analyzed for ATI is verified to not have a predisposition to track squeeze. This is accomplished by analyzing signal profile 750 of the reference data track $t_R$. The reference data track for signal profile 750 is written at a distance from subsequent data tracks so as to not be influenced by the writing of the subsequent data tracks.

If verification for track squeeze shows that the magnetic recording head being analyzed is predisposed to track squeeze, the head is rejected from the ATI identification method and another head is chosen. If verification for track squeeze shows that the magnetic recording head does not have track squeeze, then the ATI identification is allowed to proceed.

Referring now to 830 of flowchart 800 and to FIG. 7, a first data track pair, shown in FIG. 7 as $t_1$ and $t_7$, respectively, which is associated with signal profiles 710a and 710b, is written at a predetermined track position.

Referring now to 840 of flowchart 800 and to FIG. 7, a second data track pair, shown in FIG. 7 as $t_2$ and $t_6$, respectively, which is associated with signal profiles 715a and 715b, is written adjacent to and between the tracks of the first data track pair associated with signal profiles 710a and 710b.

Referring now to 850 of flowchart 800 and to FIG. 7, a middle data track, shown in FIG. 7 as $t_4$, which is associated with signal profile 725, is written between the second data track pair associated with signal profiles 715a and 715b.

Referring now to 860 of flowchart 800 and to FIG. 7, the positions of the previously written data tracks are validated. Validation is accomplished in part by analyzing signal profiles 710a and 710b of the first data track pair. Validation may be further accomplished by analyzing signal profiles 715a, 715b and 725. In accordance with an embodiment of the present invention, validation of track position may comprise analyzing peak-shift 55 and 57.

Referring now to 870 of flowchart 800, if the data track positions of the previously written data tracks are correct, the ATI identification method may continue. If the data track positions of the previously written tracks are not correct, then corrective action should be taken before continuing with the ATI identification method. Corrective action is dependent upon how the ATI identification method is being implemented.

Referring now to 880 of flowchart 800 and to FIG. 7, a third data track pair, shown in FIG. 7 as $t_3$ and $t_5$, respectively, which is associated with signal profiles 720a and 720b, is written adjacent to the middle track associated with signal profile 725. The third data track pair is also adjacent to and between the second data track pair associated with signal profiles 715a and 715b, and also between the first data track pair associated with signal profiles 710a and 710b. Multiple writings of third data track pair associated with signal profiles 720a and 720b will accentuate the affect of ATI on signal profiles 715c, 715d, and 725a. Signal profiles 710a and 710b may be affected to a different degree.

Writing the third data track pair associated with signal profiles 720a and 720b, reduces the amplitude of adjacent signal profiles 715c, 715d, and 725a. Reduced amplitude 72, 74, and 76 as well as peak-shifts 74 and 78 are the result of the third data track pair overlapping the associated data tracks of signal profiles 715a, 715b and 725.

This overlap partially erases data tracks of signal profiles 715a, 715b, and 725.

Referring now to 890 of flowchart 800 and to FIG. 7, ATI is analyzed in part from calculating reduced amplitudes 72, 74 and 76 and peak-shifts 74 and 78 in signal profiles 715a, 715b and 725. Changes to signal profiles 710a and 710b may also be analyzed. Calculated reduced amplitudes 72, 74 and 76 and peak-shifts 74 and 78 indicate the amount of ATI.

Therefore, the embodiments described herein are capable of correctly identifying magnetic recording heads with ATI from those with track squeeze; unlike prior art ATI detection methods that can mistakenly identify heads with track squeeze as heads with ATI. In doing so, accurate information can be relayed to the head manufacturer, appropriate investigations into the cause of ATI can be conducted, and corrective action taken.

Thus, embodiments described herein allow an accurate identification of ATI by validating the position of the tracks. Hence, head development resources can be properly applied to the problem of ATI and avoid resources being expended on non-ATI problems. In doing so, the time to deliver properly performing magnetic recording heads for new HDD products is accelerated.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for identifying adjacent track interference for a head wherein said method comprises: writing a first data track at a predetermined track position; writing a second data track two track positions away from said first data track; writing a third data track between said first data track and said second data track; writing a fourth data track at two track positions from said first data track and on an opposite side of said second data track; validating a position of said first data track and said fourth data track;

and analyzing a signal profile of at least one of said first data track and said second data track for adjacent track interference, wherein said validating of the position of said second data track and validating the position of said fourth data track comprises analyzing the signal profile of said second data track and said fourth data track after writing of a fifth data track and writing of a sixth data track.

2. The method as recited in claim 1, wherein said method further comprises:
   wherein said writing of said fifth data track includes writing said fifth track adjacent to said second data track and on an opposite side of said third data track;
   wherein said writing of said sixth data track includes writing said sixth track three track positions from said first data track and on an opposite side of said fifth data track; and writing a seventh data track between said first data track and said fourth data track.

3. The method as recited in claim 2, wherein said writing said fourth data track, said writing said fifth data track, said writing said sixth data track, and said writing said seventh data track comprise writing servo data.

4. The method as recited in claim 2, wherein said writing of said seventh data track comprises writing said seventh data track multiple times.

5. The method as recited in claim 2, wherein said analyzing said signal profile for adjacent track interference further comprises:
   analyzing a signal profile of said first data track;
   analyzing a signal profile of said second data track; and
   analyzing a signal profile of said fourth data track.

6. The method as recited in claim 1 further comprises verifying said head is not predisposed to track squeeze.

7. The method as recited in claim 6, wherein said verifying comprises:
   writing a reference data track with said head;
   analyzing a signal profile of said reference data track; and
   verifying the track width of said head.

8. The method as recited in claim 7, wherein said writing said reference data track comprises writing servo data.

9. The method as recited in claim 1, wherein said writing said first data track, said writing said second data track, and said writing said third data track comprise writing servo data.

10. The method as recited in claim 1, wherein said validating said position comprises analyzing said signal profile of at least one of said first data track and said second data track for peak-shift.

11. The method as recited in claim 10, wherein said analyzing said signal profile of at least one of said first data track and said second data track comprises:
    calculating reduced amplitude;
    analyzing said signal profile for said peak-shift; and
    analyzing said peak-shift for symmetry.

12. The method as recited in claim 1, wherein said writing of said third data track comprises writing said third data track multiple times.

13. A computer-readable storage medium containing computer executable instructions wherein said instruction when executed effect a method for measuring adjacent track interference for a head wherein said method comprises:
    writing a first data track pair at a predetermined track position;
    writing a second data track pair adjacent to said first data track pair, wherein said second data track pair is between tracks of said first data track pair;
    writing a middle data track between said second data track pair;
    validating position of said first data track pair from a signal profile of said first data track pair;
    writing a third data track pair adjacent to said middle data track, wherein said middle data track is between said third data track pair and wherein said third data track pair is between said second data track pair; and
    analyzing a signal profile of at least one of said first data track pair and said second data track pair for adjacent track interference.

14. The computer-readable storage medium as described in claim 13 further comprises verifying said head is not predisposed to track squeeze.

15. The computer-readable storage medium as described in claim 14, wherein said verifying comprises:
    writing a reference data track with said head;
    analyzing signal profile of said reference data track; and
    verifying the track width of said head.

16. The computer-readable storage medium as described in claim 13, wherein said writing third data track pair comprises writing said third data track pair multiple times.

17. The computer-readable storage medium as described in claim 13, wherein said validating position of said first data track pair comprises analyzing said signal profile for peak-shift.

18. The computer-readable storage medium as described in claim 13, wherein said analyzing said signal profile comprises:
    calculating reduced amplitude;
    analyzing said signal profile for said peak-shift; and
    analyzing said peak-shift for symmetry.

19. A means for measuring adjacent track interference for a head wherein said means comprises: writing means for writing a first data track pair at a predetermined track position; writing means for writing a second data track pair adjacent to said first data track pair, wherein said second data track pair is between tracks of said first data track pair; writing means writing for a middle data track between said first data track pair; validating means for validating a position of said first data track pair from a signal profile of said first data track pair; writing means for writing a third data track pair adjacent to said middle data track, wherein said middle data track is between said third data track pair and wherein said third data track pair is between said second data track pair; and analyzing means for analyzing a signal profile of at least one of said first data track and said second data track for adjacent track interference.

* * * * *